June 25, 1968   C. R. SPRINGER   3,389,688
POULTRY EGG HATCHER
Filed May 18, 1966
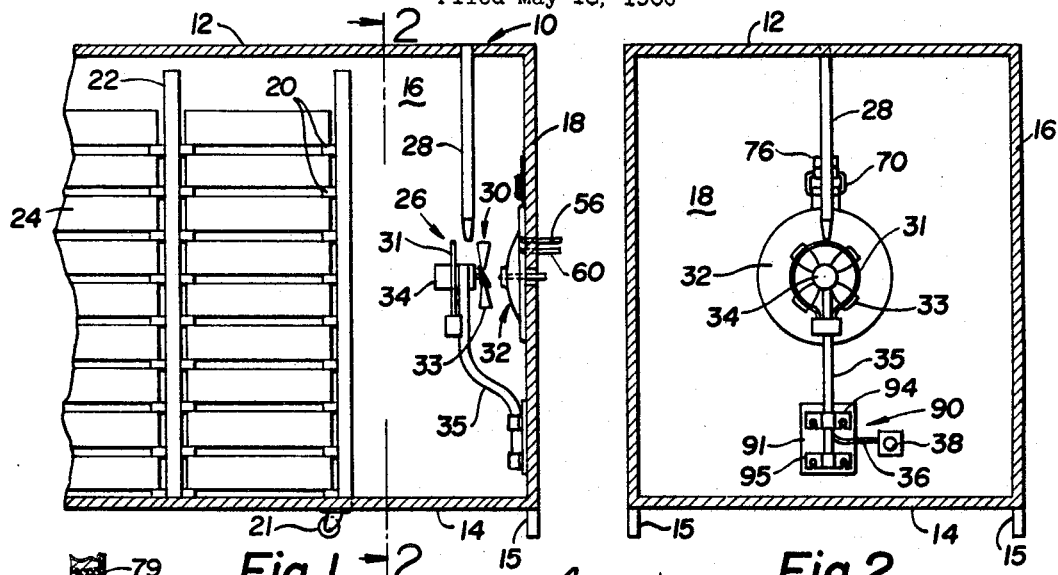
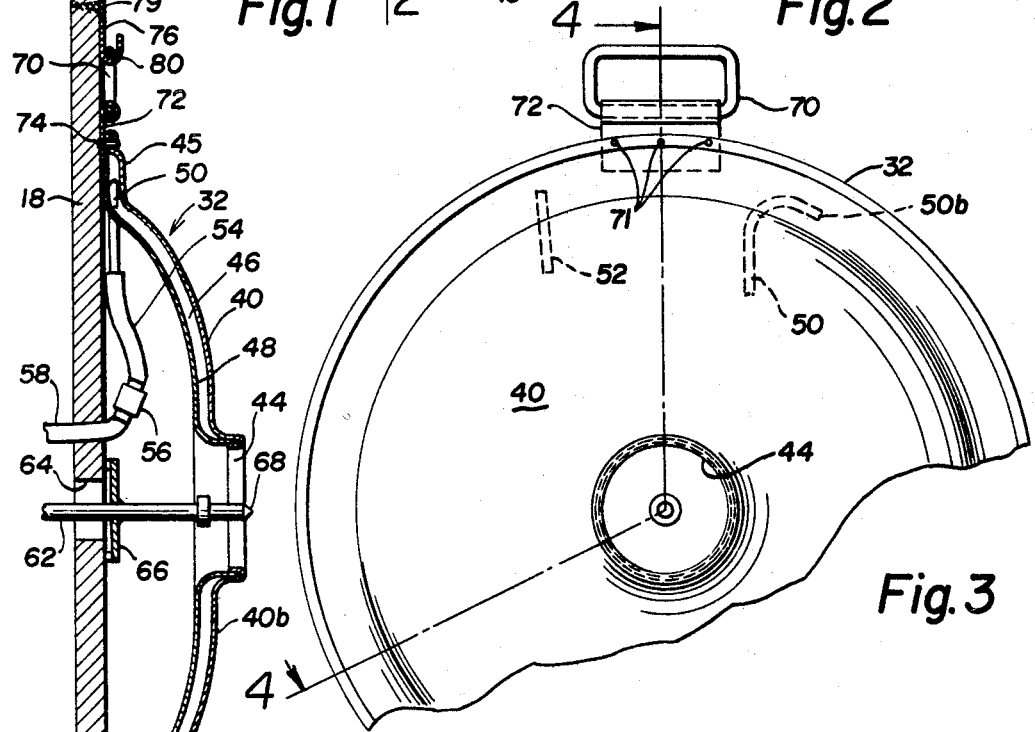
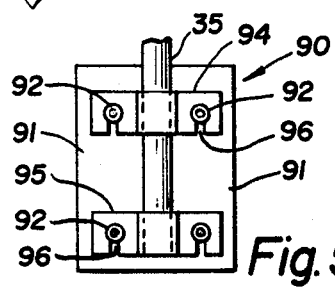
INVENTOR
CHARLES R. SPRINGER
BY Watts & Fisher
ATTORNEYS though by the improvement results from more closely controlled environmental conditions and more uniform distribution of circulated air so that proper temperature, humidity, and composition of the ambient atmosphere are maintained throughout the hatcher.

United States Patent Office 3,389,688
Patented June 25, 1968

3,389,688
POULTRY EGG HATCHER
Charles Robert Springer, Westlake, Ohio, assignor to Chick Master Incubator Corporation
Filed May 18, 1966, Ser. No. 558,156
17 Claims. (Cl. 119—35)

This invention relates to a hatcher, and more particularly to a hatcher for poultry eggs.

Hatchers provide a controlled environment for hatching eggs. In particular, the temperature, humidity and often the carbon dioxide content of the air is controlled to provide favorable conditions for hatching poultry eggs.

One problem that develops during incubation is that as the chicks hatch they begin to give off body heat. As a result, the temperature in the hatcher often increases significantly. For satisfactory results, the temperature cannot be allowed to increase appreciably above a normal operating temperature of about 98 degrees Fahrenheit.

Various arrangements have been used to control the environment in a hatcher. Heaters of various types have been used to raise the temperature when necessary. In some instances cooling tubes have been located about the perimeter of wall of the hatcher to provide cooling. Air has been circulated with paddle wheel-like fans that move the air in radial directions outward from the fan and circulate it about in the hatcher.

The deficiencies of these prior hatchers have perhaps not been fully appreciated. One reason for this lack of appreciation may be because a principal controlling factor in the efficiency of hatching of chicks from a given group of eggs is quality of the eggs. Because the quality of the eggs is a material factor in the efficiency of any given hatch, the inefficiencies of prior hatchers have not been readily apparent.

While prior hatchers have generally been considered acceptable, tests conducted with hatchers made in accordance with the teachings of this invention have demonstrated significant improvement in efficiency. The reasons for this significant improvement are not fully understood, but it is believed that the improvement results from more closely controlled environmental conditions and more uniform distribution of circulated air so that proper temperature, humidity, and composition of the ambient atmosphere are maintained throughout the hatcher.

In addition, the environmental control apparatus of the prior art incubators have had an appreciable deficiency. Paddle-wheel type fans and associated apparatus have, themselves, been difficult to clean. They have been relatively permanently mounted in the hatcher, creating obstacles to the cleaning of the hatcher itself and making this cleaning quite difficult. The present invention overcomes both of these cleaning difficulties.

The apparatus of this invention effectively controls the temperature, humidity and circulation of air within a hatcher while overcoming the above-mentioned disadvantages of prior hatchers. The improved apparatus is compact and easily removed to facilitate cleaning of both the hatcher and the apparatus. It provides circulation of air that is uniform in flow and evenly distributed. The air is simultaneously conditioned to proper temperature and humidity as it is moved into circulation so that essentially uniform, controlled, conditions exist throughout the hatcher.

This invention contemplates moving the air within a hatcher in a directed stream toward one wall of the hatcher, intercepting the stream and deflecting it in a plurality of generally radial directions. The temperature of the air is controlled at this time so that a flow of air at the desired temperature is circulated throughout the hatcher. Advantageously, the stream of air will be cooled when necessary by a deflector that intercepts the stream and directs it radially from the initial path.

In a preferred embodiment, a convex deflector is supported at a central location on the inside of the back wall of a hatcher. A fan is positioned opposite the deflector to direct a stream of air from within the hatcher directly toward the convex surface of the deflector. The convex deflector is preferably bowl or generally cone shaped and is known as a cooling cone. The term convex, as and herein, includes conical or pyramidal deflectors as well as domed, hemispherical or other curved shapes. The cooling cone includes means to control the temperature of the deflecting surface.

The preferred cooling cone of this invention is formed of spun copper with a smooth deflecting surface that reduces the accumulation of down from the chicks and other foreign material. A cooling jacket is provided behind the deflecting surface for the circulation of a cooling liquid, such as water. An opening is provided in the center of the deflector to facilitate the introduction of moisture in the form of a water spray. The construction is such that the spray can be directed toward the fan and be immediately caught in the air stream, vaporized and circulated.

An important feature of the present invention is the construction of both the cooling cone and fan so that they can be readily and conveniently removed from the hatcher when either they or the hatcher require cleaning. Preferably, the cone is hung by a loop from a hook on the back wall of the hatcher and connected to the source of cooling fluid with quick-disconnect couplings. The fan and heater are preferably both mounted on a lift-out support arm so that the entire support arm, fan and heater can be removed as a unit from the hatcher.

Accordingly, the objects of this invention are to provide a novel and improved environmental control apparatus for a hatcher and a method of operating a hatcher.

These and other objects, features and advantages of the invention will become better understood by reference to the following detailed description when considered in connection with the accompanying drawings in which:

FIGURE 1 is a partial transverse sectional view of a hatcher embodying the improved apparatus for controlling the internal environment in accordance with the present invention;

FIGURE 2 is a sectional view taken along the line 2—2 in FIGURE 1, looking in the direction of the arrows, showing the inside back wall of the hatcher of FIGURE 1, and illustrating the arrangement of parts for circulating and controlling the temperature of air within the hatcher;

FIGURE 3 is a partial front elevational view, on an enlarged scale, of an air deflector and temperature control member constructed in accordance with the present invention;

FIGURE 4 is a sectional view of the deflector of FIGURE 3, taken along the line 4—4 of FIGURE 3 and looking in the direction of the arrows, and showing constructional details of the deflector; and FIGURE 5 is a detail view on an enlarged scale of the fan support bracket of FIGURE 2.

Referring now to the drawings, the general arrangement is best shown in FIGURES 1 and 2. A hatcher for hatching eggs is shown somewhat schematically indicated generally by the reference numeral 10. The hatcher 10 has a housing including a top wall 12, a floor 14, side walls 16, a front wall (not shown) and a back wall 18. The housing 10 is supported on legs 15. The floor 14 is partial, with a front and central portion cut out to receive an egg tray buggy 19 supported on casters 21. The buggy 19 has tray support racks 20 secured at spaced intervals to vertical frame members 22. Egg trays 24, which contain eggs to be hatched are supported on the horizontal tray support bars 20. The support bars 20 provide space between each adjacent egg tray to allow circulation of air. The buggy 19 has a floor (not shown) beneath the trays 24 supported at the level of housing floor 14 by the casters 21. The floor of the buggy is received in the cut out portion of the housing floor 14 when the buggy is wheeled into the housing 10. The two floors combine to form the lower enclosing wall or floor of the housing. The front wall, not shown, is in the form of a door that completes the housing enclosure while allowing the carriage 19 to be wheeled in and out.

With the buggy 19 in place within the housing 10, space is provided between the trays 24 and the side walls 16, front wall, and back wall 18 for the circulation of air. As shown in FIGURE 1, the space adjacent the back wall 18 provides a zone across the back of the hatcher where apparatus, indicated generally at 26, is located to condition the atmosphere within the incubator.

The conditioning apparatus includes an air inlet conduit 28, a fan 30, a heating element 31 and deflector in the form of a cooling cone 32.

The air inlet conduit 28 depends from the top wall 12 to a location adjacent a central portion of the back wall 18. The conduit is open at its lower end and serves to introduce air or controlled quantities of other gases, such as carbon dioxide, to a central location adjacent the back wall.

The fan assembly 30 includes a propeller type blade 33 mounted on a motor 34. The motor 34 and the heating element 31 are both removably connected to the back wall 18 by a support arm 35. The details of the removable connection will be described below.

The heating element 31 is generally circular and positioned on the upstream side of the fan blade 33. When the heating element is energized its heat is distributed within the hatcher by the fan. Electrical wires 36 to the fan and heating element extend down the support arm 35 and communicate through an outlet 38 in the back wall 18 to a source of electric current.

The cooling cone 32 is mounted on the inside of the back wall 18, at the center of the wall in axial alignment with the fan 30. In this position the deflector intercepts the stream of air directed by the fan 30.

The cooling cone has an outer deflecting element 40. The deflecting element 40 is convex and generally dome-shaped. The deflecting element, like the entire cone, is symmetrical about a central axis and axially aligned with the fan and heater. In the embodiment shown, the cone 32 is circular in plan, has a central opening 44 and a flat, circular peripheral flange portion 45.

The deflecting element 40 is curved to deflect the air stream radially of its initial path at a multitude of angles relative to the back wall 18. To this end, the element 40 is relatively flat and almost parallel to the back wall 18 at the central portion about the opening 44. The surface gradually curves toward the back wall as the radial distance from the center increases. Preferably, the curved surface 40a adjacent the peripheral flange portion 45 will have a substantially shorter radius of curvature than the central portion 40b, being on the order of one-half as great.

A chamber or water jacket 46 is provided directly behind the deflecting element 40 to provide a means for controlling the temperature of the cone. The chamber 46 is formed by a cone back wall 48 spaced from the deflecting element. The cone wall 48 and deflecting element 40 are sealed together at the central opening 44 and at the outer edge of the peripheral flange 45. As shown, the walls are sealed together by folded, interlocking portions, pressed tightly and/or soldered together.

The deflecting element 40 is formed of metal or other highly thermal conductive material. Advantageously, the surface is spun from dead soft copper to provide high heat transfer, resistance to corrosion, and smooth surfaces. The smooth surfaces minimize the collection of down or other foreign material within the incubator, which would retard heat transfer and require frequent cleaning.

Two tubes 50, 52 are provided for admitting and discharging fluid to and from the chamber 46. The tube 50 is an inlet located behind the cone wall 48 and extends through the wall into the jacket of the flange portion 45.

The inlet tube 50 curves as shown in FIGURE 3 so that a flow of fluid is directed around the deflector. A length of plastic tubing 54 is connected to the end 50a of the inlet tube in the zone between the back wall 18 and the inner wall 48 of the deflector 32. The length of plastic tubing 54 communicates by a quick disconnect coupling 56 to main inlet tube 58 that extends through the back wall 18 to a source of water, not shown.

The tube 52 is an outlet also communicating to the chamber 46 through the back wall 48. As shown in FIGURE 3, both the inlet and the outlet tubes are located near the top of the cone 32 to keep it substantially filled in use. The outlet tube 52 is connected by plastic tubing and a quick disconnect coupling (not shown) to a main outlet tube 60 through the back wall 18, in a similar manner to that already described in connection with the inlet. The couplings, which in their simplest form can be merely connector tubes or hose couplings of the sleeve or bayonet type, facilitate the easy and rapid removal of the cooling cone for cleaning.

Water is introduced through the inlet 50, circulated about the chamber or water jacket 46 behind the deflecting element 40 and withdrawn through the outlet 52. By varying the temperature of water supplied to the cone 32 and the rate at which it is circulated, the cooling effect of the cone on air impinged on the element 40 may be varied in a controlled manner.

A spray nozzle 62 extends through an opening 64 in the center of the back wall 18 for introducing moisture into the water supplied under pressure from a source (not shown) outside of the incubator. The nozzle is aligned with the central opening 44 of the deflector 32. A mounting plate 66 secures the nozzle in a fixed position relative to the inside surface of the back wall 18. An outlet end 68 of the nozzle is directed toward the center of the fan blades 33 so that a fine spray of water can be introduced into the air stream from the fan.

For ease of installation and removal, the cone 32 is provided with a handle 70 secured to the rim or flange portion 45 by a strap 72. As best shown in FIGURE 3, the handle 70 is formed of a closed loop having straight upper and lower portions. The lower portion is encircled by a portion of the strap 72 so that the handle 70 is pivoted with respect to the strap. Three rivets 71 extend through the sealed rim portion of the flange 45 and fasten the strap 72 to the back surface of the flange portion.

A cone support bracket 76 is secured to the inner surface of the back wall 18 by spaced screws, one of which is shown in FIGURE 4 at 79. The cone bracket is in the form of a flat plate with a U-shaped bottom portion 80 that provides an upwardly opening channel for receiving the top portion of handle 70. The position of the cone bracket is fixed on the back wall 18 so that the center opening 44 of the deflector 32 is located directly opposite the opening 64 in the back wall 18 when the handle 70 is hooked over the cone bracket.

A fan support bracket 90 is secured to a lower portion of the inside of the back wall 18 and provides a lift out support for the fan 30 and heating unit 31. The fan bracket 90 is formed of a flat plate 91 secured to the wall surface beneath the opening 50. Four spaced pins or lugs 92 extend from the surface of the flat plate 91 toward the inside of the hatcher. The pins or lugs 92 each have a flat head at the outer end of a narrower shank portion.

Two cross pieces 94, 95 are secured to a straight, vertical lower portion of the support arm 35. Each cross piece 94, 95 is provided with two vertical slots 96 in the lower edge of the cross piece, one on each side of the support arm 35. The slots 96 are somewhat wider than the diameter of the shank portion of the pins or lugs 92 and narrower than the head portions. Also, they are preferably wider at the bottom, open, end of the slot to facilitate alignment with the lugs 92. The head portions of the lugs 92 are spaced from the flat plate 91 a distance somewhat greater than the thickness of the cross pieces 94, 95. With this arrangement, the support arm 35 with the attached heating element 31 and fan 30 can be lifted as a unit in a vertical direction, so that the cross pieces 94, 95 and slots 96 are free from the mounting lugs 92. The bracket can similarly be placed into position without loosening or removing any part.

In operation, the motor 34 of fan 30 is energized to rotate the fan blade 33. This moves a stream of air within the hatcher toward the cone 32. Fresh air or a mixture of air and carbon dioxide in desired proportions is introduced through the inlet conduit 28 directly behind the fan blade 33. Air can be vented from the hatcher through suitable vents, not shown.

In the event the temperature within the hatcher is too low, the heating element 34 is energized and air is drawn by the fan 30 across the heating element 34 and directed against the cone 32.

As the air moves in a stream from the fan 30 toward the deflector element 40, water spray can be ejected from the nozzle 62 if the humidity is too low. The spray of water is vaporized in the moving air from the fan 30. This air then strikes the deflector element 40 and is deflected radially of its initial path at a multitude of different angles relative to the back wall 18, as determined by the curvature of the element 40. With the dome-shaped surface shown, the air is deflected at virtually all angles from almost straight back to essentially parallel with the back wall 18, about the entire 360 degrees of the deflector. This provides a full and uniform diffused flow of air from the deflector and back wall area forward, through substantially the entire volume of the hatcher.

Where the air within the hatcher is at a temperature higher than desired, water at a temperature lower than the air temperature desired is circulated through the jacket 46 of the cone 32. The heating element 31 is de-energized and the flow of air from the fan 30 is cooled as it impinges against the outer deflecting surface 40 of the deflector 32.

By controlling the temperature, humidity, air content, and air flow from a point adjacent the central back wall area of the hatcher, a controlled and diffused flow of conditioned air is uniformly supplied throughout the entire volume of the incubator. At the same time, the air conditioning elements are apart from the egg trays and may be easily removed to facilitate cleaning.

While a preferred embodiment of this invention has been described with particularity, it will be understood that various modifications or alterations may be made therein without departing from the spirit and scope of the invention, as set forth in the appended claims.

What is claimed is:
1. A hatcher comprising
    (a) an enclosure having wall portions;
    (b) means within the enclosure adjacent a wall portion to move air in a path within the hatcher toward the adjacent wall portions; and
    (c) an air deflector within the enclosure between the said adjacent wall portion and the air moving means, said deflector having a convex surface, in said air path, that faces away from the adjacent wall portion toward the means to move air.
2. The hatcher of claim 1 including means to independently control the temperature of the deflector with respect to the temperature within the enclosure.
3. The hatcher of claim 2 wherein the means to control the temperature of the air deflector includes means to lower the temperature of the deflector below the ambient temperature within the hatcher.
4. The hatcher of claim 1 wherein the means to move air is a propeller-type fan positioned to move air in a direct flow toward the adjacent wall portion.
5. The hatcher of claim 4 including a support bracket connected to the fan, and a bracket mounting within the enclosure, said bracket and mounting being constructed and arranged to permit the support bracket and fan to be lifted as a unit from the mounting and removed from the enclosure.
6. The hatcher of claim 4 including heating means adjacent the deflector and fan to heat air moved by the fan and deflected by the deflector.
7. The hatcher of claim 1 wherein the enclosure is formed of a plurality of rectangular walls which include the said adjacent wall portion, and the deflector is located at a central portion of one of the walls.
8. The hatcher of claim 1 wherein the deflector is constructed of metal to provide high thermal conductivity and with means for circulating fluid behind and in heat-transfer relationship with the convex surface.
9. The hatcher of claim 1 wherein the deflector includes an opening through the convex surface, and spray means at the opening to direct a spray of water outwardly from the deflector.
10. The hatcher of claim 1 wherein the convex surface of the deflector is generally dome-shaped, providing central surface portions generally parallel to and spaced from the adjacent wall and other portions located outward from the central portions that curve toward the adjacent wall, whereby air moving directly toward the surface, is deflected in all directions.
11. In a hatcher for poultry eggs and chicks:
    (a) a housing forming an enclosure for containing poultry eggs and chicks under controlled conditions;
    (b) a fan within the enclosure adjacent a wall thereof disposed to direct a flow of air within the enclosure toward the wall;
    (c) a support connected to the fan, constructed and arranged to locate the fan opposite a central portion of the wall, and including a bracket mounting secured to the enclosure, said bracket and support being constructed and arranged to permit the support and fan to be easily removed as a unit from the enclosure without disassembly or removal of fasteners;
    (d) a deflector having a convex air deflecting surface facing the fan in the path of said flow;
    (e) support means on the wall toward which the fan directs air, for removably suspending the deflector between the fan and the wall in line with the flow of air directed by the fan toward the wall during operation; and
    (f) means to control the temperature of the deflector independently of the temperature within the enclosure.
12. The hatcher of claim 11 including a heater carried on the support for the fan within the enclosure.
13. The hatcher of claim 12 wherein the means to control the temperatures of the deflector includes a passageway for the circulation of cooling fluid in contact with the deflector, conduits connected with the deflector for supplying and carrying away cooling fluid to and from the jacket and means to couple the conduits to a source of fluid supply and drain.
14. The hatcher of claim 13 wherein the deflector has a central opening in the convex surface, and including a spray nozzle extending through the opening toward the fan.

15. A temperature controlled air deflector for use with a hatcher, which comprises:
  (a) an element having a convex deflecting surface that is circular in plan, symmetrical about a central axis and includes a central opening through the deflecting surface adapted to receive a spray nozzle therethrough,
  (b) a chamber behind the deflecting surface for circulating fluid in heat transfer relationship with the element, and
  (c) means to introduce and withdraw fluid to and from the chamber.

16. The deflector of claim 15 wherein the deflecting surface is smooth and highly thermal conductive, and the chamber is formed by a wall spaced behind substantially the entire area of the deflecting surface.

17. The deflector of claim 16 wherein the deflecting surface is circular in plan, symmetrical about a central axis and the curvature of a central portion is formed with a radius approximately twice as great as the radius of a peripheral curved portion.

References Cited

UNITED STATES PATENTS

| | | | |
|---|---|---|---|
| 1,850,918 | 3/1932 | Bundy | 119—35 |
| 1,968,355 | 7/1934 | Schaefer | 119—35 |
| 1,977,905 | 10/1934 | Bohmker | 119—37 |
| 2,319,091 | 5/1943 | Smith et al. | 119—37 |
| 2,997,021 | 8/1961 | Bailey | 119—37 |

ALDRICH F. MEDBERY, *Primary Examiner.*